(12) United States Patent
Datt et al.

(10) Patent No.: US 12,421,011 B2
(45) Date of Patent: Sep. 23, 2025

(54) COATINGS AND ARTICLES WITH LIGHT-BLOCKING PROPERTIES

(71) Applicant: SIEGWERK DRUCKFARBEN AG & CO. KGAA, Siegburg (DE)

(72) Inventors: Ashish Datt, West Des Moines, IA (US); John Kilbo, Morganton, NC (US); Ayuna Tsyrenova, West Des Moines, IA (US)

(73) Assignee: SIEGWERK DRUCKFARBEN AG & CO. KGAA, Siegburg (DE)

( * ) Notice: Subject to any disclaimer, the term of this patent is extended or adjusted under 35 U.S.C. 154(b) by 511 days.

(21) Appl. No.: 17/896,173

(22) Filed: Aug. 26, 2022

(65) Prior Publication Data

US 2024/0083657 A1    Mar. 14, 2024

(51) Int. Cl.
| | |
|---|---|
| *B65D 81/30* | (2006.01) |
| *B65D 65/42* | (2006.01) |
| *C08J 11/24* | (2006.01) |
| *C08L 67/03* | (2006.01) |
| *C09D 11/037* | (2014.01) |
| *C09D 11/104* | (2014.01) |
| *C09D 11/14* | (2006.01) |

(52) U.S. Cl.
CPC ............. *B65D 81/30* (2013.01); *B65D 65/42* (2013.01); *C08J 11/24* (2013.01); *C08L 67/03* (2013.01); *C09D 11/037* (2013.01); *C09D 11/104* (2013.01); *C09D 11/14* (2013.01); *B65D 2565/385* (2013.01); *C08J 2367/03* (2013.01); *C08L 2201/10* (2013.01)

(58) Field of Classification Search
CPC .. B65D 2565/385; B65D 65/42; B65D 81/30; C08J 11/24; C08J 2367/03; C08L 2201/10; C08L 67/03; C09D 101/18; C09D 11/037; C09D 11/104; C09D 11/14
See application file for complete search history.

(56) References Cited

FOREIGN PATENT DOCUMENTS

GB          1035566    *   7/1966   .............. C08F 29/16

* cited by examiner

*Primary Examiner* — Lawrence D Ferguson
(74) *Attorney, Agent, or Firm* — Finch & Maloney PLLC (57) ABSTRACT

The present invention is related to a composition for manufacturing a layer (4a, 4b, 4c) that is capable of at least partially blocking light in the UV/VIS region and is deinkable, said composition comprising a blend of a pigment and a filler. The present invention is also related to a printed article, comprising a transparent substrate (3) and on said transparent substrate (3) at least one ink layer (4a, 4b, 4c) being made from said composition. The present invention is furthermore related to a container for storing a product, preferably a food product, wherein said container comprises a transparent substrate (2) containing on its outer surface said printed article, and to a method for deinking said container.

20 Claims, 6 Drawing Sheets

COATINGS AND ARTICLES WITH LIGHT-BLOCKING PROPERTIES

The present invention is related to coatings and articles with light-blocking properties that are recyclable. The present invention enables protection of light-sensitive products in a storage container such as a bottle.

It is known that certain food products have to be protected from light in order to ensure prolonged storage of such products. The reason is that such food products contain components such as pigments, vitamins, proteins, fats, or oil (usually these components are called photosensitizers) that upon interaction with light become degraded and/or may generate reactive chemical compounds such as reactive oxygen species (ROS) that may cause undesired chemical changes in the food product.

For example, milk and dairy products contain vitamins, fats and chlorophylls (minute amounts), which components may become degraded, and also can cause off-flavor to the dairy product in terms of color, odor, and taste.

In vegetable oils, carotenoids, fats, and chlorophylls are present which may become degraded or discolored, also under formation of off-flavor, which sometimes is referred as rancidity.

Vitamins and phenolic components in wine may become discolored or degraded, also under formation of off-flavor.

In order to prevent these adverse reactions from occurring in such light-sensitive products, such food products are conventionally stored in white or colored containers such as colored glass or plastic bottles, or else in clear containers on which a colored (e.g. white or black) film is applied.

As an example for the latter technology, shrink sleeve solutions such as provided by Klöckner Pentaplast (KP) may be mentioned. On a clear container (such as a PET bottle), a colored shrink sleeve film or packaging is applied. For example, chocolate-flavored milk drinks, protein shakes, and dairy creamers are offered in such bottles.

The problem with those approaches is that the colored substrates or colored films are challenging with respect to recyclability. Colored bottles, for example, typically are recycled with materials of like color, since otherwise cross-contamination will lead to a severe reduction of material quality and will significantly limit the further use of such recycled materials. Colored containers require sortation to avoid cross-contamination.

However, due to increasing environmental concerns, the conventional approach of throwing away articles after use has to be replaced by approaches involving the recycling of the articles or materials making up those articles. In some regions (e.g. the EU) regulations have been implemented requiring a certain recycling rate to be obtained until a certain point in time. Furthermore and independent from regulations, all major brand owners made commitments to increase the amount of recycled material in their products.

It was the problem of the present invention to provide coatings and articles with appropriate light-blocking properties for storing light-sensitive products and are better recyclable than existing solutions.

The above problem has been solved by the present invention.

In detail, the present invention is related to a composition for manufacturing a layer that is capable of at least partially blocking light in the UV/VIS region and is deinkable, said composition comprising 10-50 wt.-% a blend of a pigment and a filler
10-40 wt.-% of a first binder component, preferably nitrocellulose,
5-30 wt.-% of a second binder component, preferably selected from the group consisting of polyurethane, maleic resin and acrylic resin, and
optionally an organic solvent and additives,
wherein all wt.-% are based on the entire amount of the composition.

The composition according to the present invention meets both the requirements of providing an appropriate light-blocking effect of a layer made from said composition and providing for removability of a layer made from said composition, from a transparent substrate.

As result, said composition can be used for manufacturing light-blocking layers that allow for excellent recyclability.

According to the present invention, the term "deinkable" means that a layer manufactured from the composition of the present invention can be removed in an alkaline aqueous medium having a pH value from more than 7 to 14, more preferably 7.5 to 12.5, at an elevated temperature of between 50 to 90° C., preferably 60 to 85° C., within a period of time in the range between 1 to 15 minutes, preferably 1 to 10 minutes, especially preferable 2 to 6 minutes.

According to the present invention, the term "at least partially blocking light in the UV/VIS region" means that light in the UV/VIS range of the electromagnetic spectrum, i.e. electromagnetic radiation having a wavelength in the range from about 200 nm to about 800 nm, is at least partially reduced from transmittance. Transmittance can be prevented by the effects of absorption or reflectance (scattering). More specifically, "at least partially" is to be understood according to the present invention to mean that transmittance of light through the object in question is prevented to a degree of 95-100%, preferably 99-99.9%, more preferably 99.4-99.8%. In other words, only at most 5%, preferably 0.1-1%, more preferably 0.2-0.6% of the light arriving at an object in question will be able to transmit therethrough.

According to the present invention, this is achieved by adding a blend of a pigment and a filler into the composition of the present invention.

According to the present invention, any pigment that absorbs or reflects electromagnetic radiation in the UV/VIS range of the electromagnetic spectrum may be used. Preferably, the pigment is selected from the group consisting of a white pigment, preferably $TiO_2$, and a silver pigment.

A white pigment such as $TiO_2$ provides opacity (i.e. blocks light transmittance) by scattering. The degree of scattering is dependent on the particle size (crystal size) of the pigment.

According to a preferred embodiment of the present invention, said white pigment has an average particle size (crystal size) ($D_{50}$) in the range from 0.12 to 0.3 μm, preferably 0.22 to 0.25 μm. Pigments having such a size provide for optimum scattering in the RGB range of the visible spectrum.

Average particle sizes (crystal sizes) can be determined by methods known in the art, preferably laser diffraction or transmission/scanning electron microscopy.

According to the present invention, it has been furthermore found that white pigments with an oil absorption value of preferably more than 30, more preferably between 30 and 40, provided for improved light blocking performance.

The oil absorption value represents an index of the absorption capacity of a substance in question. The oil absorption value is usually expressed in terms of the mass of linseed oil required for 100 g of pigment (% or g/100 g), that is, the minimum amount of oil required to achieve complete wetting per 100 g of pigment. According to another embodiment of the present invention, the pigment may be a metallic pigment if silver shade, also referred to as silver pigment. Silver pigments (aluminium pigments) are also known and commercially available. According to the present invention, silver pigments with all leafing and non-leafing grades can be used. Preferably, said silver pigment has an average particle size ($D_{50}$) in the range from 5 to 20 µm, preferably 5 to 10 µm. Pigments having such a size provide for optimum scattering in the RGB range of the visible spectrum.

According to a preferred embodiment of the present invention, vacuum metalized pigments (VMP) are used in a non-leafing grade.

According to another preferred embodiment of the present invention, silver pigments with a cornflake morphology are used in a leafing grade.

In the composition of the present invention, more than one pigment may be used. For example, it is possible to provide blends of different white pigments or a blend of a white pigment and a silver pigment as defined above. In such blends, it is also possible to combine a white pigment with the above specifications as to particle size (crystal size) and oil absorption value with other white pigments that do not meet those specifications. However, at least 35%, preferably at least 50% and more preferably at least 70% of all white pigments should meet the above specifications.

According to the present invention, in addition to said pigment, a filler is present in the composition. Fillers are commonly known in the art. According to the present invention, a filler that absorbs or reflects electromagnetic radiation in the UV/VIS range of the electromagnetic spectrum may be used. Preferably, the filler is selected from the group consisting of clay, barium sulfate, silica, mica and calcium carbonate.

According to the present invention, 10-50 wt.-% of said blend of a pigment and a filler are used in the composition of the present invention, based on the entire weight of the composition. Preferably, 20-50 wt.-%, more preferably 30-45 wt.-% of said blend of a pigment and a filler are used in the composition of the present invention.

According to a preferred embodiment of the present invention, said blend contains said at least one white pigment and said filler in a range from 99:1 to 80:20, preferably 90:10 to 80:20, or said at least one silver pigment and said filler in a range from 5:95 to 90:10, preferably 8:92 to 80:20.

The composition according to the present invention can be readily deinked, i.e. it is dissolvable in an alkaline aqueous medium. On the other hand, the composition according to the present invention exhibits very good overprintability and water resistance.

This is particularly achieved by a combination of a first binder component and a second binder component.

The composition according to the present invention comprises said first binder component in an amount of 10-40 wt.-%, preferably 10-30 wt.-%, based on the entire weight of the composition. The first binder component is preferably nitrocellulose or polyurethane.

The composition according to the present invention comprises said second binder component in an amount of 5-30 wt.-%, preferably 5-20 wt.-%, based on the entire weight of the composition. According to a preferred embodiment of the present invention, said second binder component is selected from the group consisting of polyurethane, maleic resin, a polyvinyl ester such as polyvinyl acetate, and acrylic resin. Such binders are commonly known.

According to a preferred embodiment, the first and second binder component may be identical. This is particularly the case if a polyurethane resin is used as a binder component.

As a polyurethane resin, preferably a semi-aliphatic resin is used, i.e. a resin being made of aliphatic polyisocyanates and aromatic polyisocyanates. Preferably, said polyurethane resin does not comprise any toluene diisocyanate (TDI) moieties.

Maleic resins are also commonly known. Preferably, a gum rosin resin modified with fumaric resin can be used.

Polyvinyl esters and their synthesis are known in the art. Generally, they are composed of vinyl alcohol units that are polymerised by a radical polymerisation mechanism, and wherein the hydroxy groups of the vinyl alcohol units have been converted into respective ester units. Preferably, the polyvinyl esters according to the present invention are defined by the following formula wherein
R is a linear or branched $C_{1-10}$ alkyl residue, preferably, $CH_3$, $C_2H_5$, $C_3H_7$, and $C_4H_9$, and
n is an integer from 10 to 100, preferably, 10 to 50.

According to the present invention, preferred polyvinyl esters are polyvinyl acetate, polyvinyl propionate, and polyvinyl butyrate. The polyvinyl esters to be preferably used in the present invention may be fully esterified or esterified to such an extent that they have a hydroxyl value of 0-400 mg KOH/g.

According to a preferred embodiment of the present invention, the polyvinyl esters may be at least partially hydrolysed under the deinking conditions of the present invention described below.

Polyvinyl esters that are suitable for the deinking primer composition of the present invention are commercially available. Examples are Vinnapas (Polyvinyl acetate) and Elvanol, Poval and Excerval (partly hydrolysed polyvinyl acetate).

As acrylic resin, a polyacrylate may be used. Polyacrylates are known in the art. Generally, polyacrylates are composed of acrylic acid or methacrylic acid units that are polymerised by a radical polymerisation mechanism, and wherein the carboxyl groups of the acrylic acid or methacrylic acid units have been at least partially converted into respective ester units. Preferably, the polyacrylates according to the present invention are defined by the following formula wherein
$R^1$ is a linear or branched $C_{1-10}$ alkyl residue, preferably, $CH_3$, $C_2H_5$, $C_3H_7$, and $C_4H_9$, and combinations thereof, $R^2$ is H or $CH_3$, and n is an integer from 10 to 100, preferably, 10 to 50.

According to the present invention, also copolymers of acrylates or methacrylates with other monomers may be suitable. As an example, a styrene-acrylate copolymer may be mentioned whose free carboxylic acid groups have preferably at least been partially esterified to such an extent that they have an acid value of 0-50 mg KOH/g.

Polyesters that are suitable for the deinking primer composition of the present invention are commercially available. Examples are Degalan, Neocryl, Dianal, Elvacite, or PChem.

The primer composition according to the present invention may further comprise at least one organic solvent. Any organic solvent that is conventionally used in printing inks compositions may be used. Examples are esters such as ethyl acetate, n-propyl acetate, isopropyl acetate, or neopentyl acetate, or alcohols such as ethanol, n-propanol or isopropanol. Preferably, the primer composition of the present invention comprises 20 to 60 wt.-%, more preferably 30 to 50 wt.-%, based on the weight of the entire primer composition, of said at least one solvent.

The primer composition according to the present invention may further comprise one or more additives conventionally used in ink compositions. Examples are waxes such as polyethylene wax, plasticizers, silicones such as polydimethyl siloxane, and adhesion promoters. Preferably, the primer composition of the present invention comprises 0 to 10 wt.-%, more preferably 0.1 to 5 wt.-%, based on the weight of the entire primer composition, of at least one additive.

According to another embodiment of the present invention, the compositions described herein are radiation curable ink compositions. Radiation curable compositions are compositions that may be cured by UV-visible light radiation (hereafter referred as UV-Vis-curable) or by Electron-beam radiation (hereafter referred as EB). Radiation curable compositions provide advantages of non-solubility in aggressive surfactants and alkaline-based recycling solutions. Non-solubility allows for minimized contamination to the surrounding recycling solution and recyclate contained, therefore allowing for clean filtration of ink particulates and non-recombination onto captured recyclate.

Radiation curable compositions are known in the art and can be found in standard textbooks such as the series "Chemistry & Technology of UV & EB Formulation for Coatings, Inks & Paints", published in 7 volumes in 1997-1998 by John Wiley & Sons in association with SITA Technology Limited. The radiation curable ink compositions described herein are preferably UV-Vis-curable ink compositions.

Preferably the one or more binders of the UV-Vis-curable ink compositions described herein are prepared from compounds selected from the group consisting of radically curable compounds, cationically curable compounds and mixtures thereof. Preferably the one or more binders of the UV-Vis-curable ink compositions described herein are prepared from radically curable compounds. Radically curable compounds are cured by free radical mechanisms consisting of the activation by energy of one or more photoinitiators which liberate free radicals which in turn initiate the polymerization so as to form the binder. Cationically curable compounds are cured by cationic mechanisms consisting of the activation by energy of one or more photoinitiators which liberate cationic species, such as acids, which in turn initiate the polymerization so as to form the binder. Preferably, the one or more binders of the UV-Vis-curable ink compositions described herein are prepared from compounds selected from the group consisting of (meth)acrylates, vinyl ethers, propenyl ethers, cyclic ethers such as epoxides, oxetanes, tetrahydrofuranes, lactones, cyclic thioethers, vinyl and propenyl thioethers, hydroxyl-containing compounds and mixtures thereof. More preferably, the one or more binders of the UV-Vis-curable ink compositions described herein are prepared from compounds selected from the group consisting of (meth)acrylates, vinyl ethers, propenyl ethers, cyclic ethers such as epoxides, oxetanes, tetrahydrofuranes, lactones and mixtures thereof.

According to one embodiment of the present invention, the one or more binders of the UV-Vis-curable ink compositions described herein are prepared from radically curable compounds selected from (meth)acrylates, preferably selected from the group consisting of epoxy (meth)acrylates, (meth)acrylated oils, polyester (meth)acrylates, aliphatic or aromatic urethane (meth)acrylates, silicone (meth)acrylates, amino (meth)acrylates, acrylic (meth)acrylates, acrylates melamine oligomers, and mixtures thereof. The term "(meth)acrylate" in the context of the present invention refers to the acrylate as well as the corresponding methacrylate. The one or more binders of the UV-Vis-curable compositions described herein may be prepared with additional vinyl ethers and/or monomeric acrylates such as for example trimethylolpropane triacrylate (TMPTA), pentaerytritol triacrylate (PTA), tripropyleneglycoldiacrylate (TPGDA), dipropyleneglycoldiacrylate (DPGDA), hexanediol diacrylate (HDDA) and their polyethoxylated equivalents such as for example polyethoxylated trimethylolpropane triacrylate, polyethoxylated pentaerythritol triacrylate, polyethoxylated tripropyleneglycol diacrylate, polyethoxylated dipropyleneglycol diacrylate and polyethoxylated hexanediol diacrylate. The one or more binders are preferably present in an amount from about 5% to about 95% by weight, more preferably from about 10% to about 80% by weight, and still more preferably from about 20% to about 60% by weight, the weight % being based on the total weight of the UV-Vis-curable ink composition.

According to another embodiment of the present invention, the one or more binders of the UV-Vis-curable ink compositions described herein are prepared from cationically curable compounds selected from the group consisting of vinyl ethers, propenyl ethers, cyclic ethers such as epoxides, oxetanes, tetrahydrofuranes, lactones, cyclic thioethers, vinyl and propenyl thioethers, hydroxyl-containing compounds and mixtures thereof, preferably cationically curable compounds selected from the group consisting of vinyl ethers, propenyl ethers, cyclic ethers such as epoxides, oxetanes, tetrahydrofuranes, lactones and mixtures thereof. Typical examples of epoxides include without limitation glycidyl ethers, β-methyl glycidyl ethers of aliphatic or cycloaliphatic diols or polyols, glycidyl ethers of diphenols and polyphenols, glycidyl esters of polyhydric phenols, 1,4-butanediol diglycidyl ethers of phenolformalhedhyde novolak, resorcinol diglycidyl ethers, alkyl glycidyl ethers, glycidyl ethers comprising copolymers of acrylic esters (e.g. styrene-glycidyl methacrylate or methyl methacrylate-glycidyl acrylate), polyfunctional liquid and solid novolak glycidyl ethers resins, polyglycidyl ethers and poly(β-methylglycidyl) ethers, poly(N-glycidyl) compounds, poly(S-glycidyl) compounds, epoxy resins in which the glycidyl groups or β-methyl glycidyl groups are bonded to hetero atoms of different types, glycidyl esters of carboxylic acids and polycarboxylic acids, limonene monoxide, epoxidized soybean oil, bisphenol-A and bisphenol-F epoxy resins. Suitable examples of aromatic, aliphatic or cycloaliphatic vinyl ethers include without limitation compounds having at least one, preferably at least two, vinyl ether groups in the molecule. Examples of vinyl ethers include without limitation triethylene glycol divinyl ether, 1,4-cyclohexanedimethanol divinyl ether, 4-hydroxybutyl vinyl ether, propenyl ether of propylene carbonate, dodecyl vinyl ether, tert-butyl vinyl ether, tert-amyl vinyl ether, cyclohexyl vinyl ether, 2-ethylhexyl vinyl ether, ethylene glycol monovinyl ether, butanediol monovinyl ether, hexanediol monovinyl ether, 1,4-cyclohexanedimethanol monovinyl ether, diethylene glycol monovinyl ether, ethylene glycol divinyl ether, ethylene glycol butylvinyl ether, butane-1,4-diol divinyl ether, hexanediol divinyl ether, diethylene glycol divinyl ether, triethylene glycol divinyl ether, triethylene glycol methylvinyl ether, tetraethylene glycol divinyl ether, pluriol-E-200 divinyl ether, polytetrahydrofuran divinyl ether-290, trimethylolpropane trivinyl ether, dipropylene glycol divinyl ether, octadecyl vinyl ether, (4-cyclohexyl-methyleneoxyethene)glutaric acid methyl ester and (4-butoxyethene)-iso-phthalic acid ester. Examples of hydroxy-containing compounds include without limitation polyester polyols such as for example polycaprolactones or polyester adipate polyols, glycols and polyether polyols, castor oil, hydroxy-functional vinyl and acrylic resins, cellulose esters, such as cellulose acetate butyrate, and phenoxy resins.

Alternatively, the one or more binders of the UV-Vis-curable ink compositions described herein are hybrid binders and may be prepared from a mixture of radically curable compounds and cationically curable compounds such as those described herein.

The UV-Vis-curable ink composition comprises one or more photoinitiators. As known by those skilled in the art, the one or more photoinitiators are selected according to their absorption spectra and are selected to fit with the emission spectra of the radiation source. Depending on the monomers, oligomers or prepolymers used to prepare the one or more binders comprised in the UV-Vis-curable compositions described herein, different photoinitiators might be used. Suitable examples of free radical photoinitiators are known to those skilled in the art and include without limitation acetophenones, benzophenones, alpha-aminoketones, alpha-hydroxyketones, phosphine oxides and phosphine oxide derivatives and benzyldimethyl ketals. Suitable examples of cationic photoinitiators are known to those skilled in the art and include without limitation onium salts such as organic iodonium salts (e.g. diaryl iodinium salts), oxonium (e.g. triaryloxonium salts) and sulfonium salts (e.g. triaryl-sulphonium salts). Other examples of useful photoinitiators can be found in standard textbooks such as "Chemistry & Technology of UV & EB Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited. The one or more photoinitiators comprised in the ink composition are preferably present in an amount from about 0.1 to about 20 weight percent, more preferably about 1 to about 15 weight percent, the weight percents being based on the total weight of the ink composition. When present, the one or more photoinitiators may be added to the ink composition either during the dispersing or mixing step of all other ingredients or may be added at a later stage, i.e. after the formation of the ink.

It may also be advantageous to include one or more sensitizers in conjunction with the one or more photoinitiators in order to achieve efficient curing. Typical examples of suitable photosensitizers include without limitation isopropyl-thioxanthone (ITX), 1-chloro-2-propoxy-thioxanthone (CPTX), 2-chloro-thioxanthone (CTX) and 2,4-diethyl-thioxanthone (DETX) and mixtures thereof. When present, the one or more photosensitizers are preferably present in an amount from about 0.1% to about 15% by weight, more preferably about 0.5% to about 5% by weight, the weight % being based on the total weight of the ink composition.

The UV-Vis-curable ink composition may comprise one or more diluents. The optional diluents consist of one or more low molecular weights and low viscosity monomers or oligomers. Typically, the diluents comprise one or more reactive moieties that may react with the binder components during the UV-VIS-curing process. Thus, preferably the diluents are reactive diluents that comprise one, two or more functional moieties. The reactive diluents are used as viscosity cutting agents to reduce the viscosity of the ink composition. When present, the one or more diluents are preferably present in an amount from about 1% to about 30% by weight, more preferably about 10% to about 30% by weight, the weight % being based on the total weight of the ink composition.

In addition, the UV-curable compositions described therein may additionally comprise conventional additives, which typically are the same as described above for the ink composition of the other embodiment of the present invention. Those additives are commonly known to a person skilled in the art.

An example of the ultraviolet curable ink composition of the present invention comprises a photocurable organic composition comprising at least one acrylated oligomer, acrylate monomer, pigment, and a photoinitiator. The ultraviolet curable ink composition typically has a viscosity from about 300-1500 centipoise for flexography inks, 600 to 8000 centipoise for screen based inks and 10000-50000 for offset inks (at 25° C.). Measurements are typically made with a cone and plate rheometer at a shear rate in the range from 10 to 1000 1/s.

The composition according to the present invention can be used for providing an opaque ink layer on a transparent substrate. In contrast to the prior art where an opaque (mostly white) substrate was used as a film for protecting light-sensitive products in a container, which is difficult to recycle, according to the present invention recycling of the substrate becomes very easy by deinking, i.e. dissolving the applied ink layer in an aqueous alkaline medium.

According to the present invention, a light-sensitive product is a product that contains components which under typical storage conditions may become degraded or discolored due to interaction with ambient light, leading to the problems described above.

Thus, the present invention is also related to a printed article, comprising a transparent substrate and on said transparent substrate at least one ink layer that is capable of at least partially blocking light in the UV/VIS region and is deinkable, said layer being made from a composition according to the present invention.

Although any transparent substrate may be used according to the present invention, the substrate is preferably a transparent polymer (such as a polyolefin, like polyethylene or polypropylene, or PET) and particularly preferred composed of polyethylene terephthalate (PET). This is especially preferred if the printed article is used in combination with a container that is also composed of polyethylene terephthalate (PET). In said case, the transparent substrate and the container can be readily recycled together, as being made from the same material.

Preferably, said transparent substrate is composed of biaxially oriented PET. Biaxially oriented PET is known and may be obtained, for example, by extruding molten PET onto a roll and then drawing the thus obtained film in the machine direction and subsequently in the transverse direction. Typically, the biaxially oriented PET is then crystallized.

Preferably, the biaxially oriented PET may also be chemically coated or corona-treated, as known in the art.

According to the present invention, the transparent substrate preferably has a thickness in the range from 10-30 µm, preferably 10-25 µm.

According to the present invention, on one surface of said transparent substrate there is provided at least one ink layer that is made from a composition according to the present invention.

The ink layer of the present invention can be applied onto the substrate by any conventional coating technique, preferably by flexographic or gravure printing.

Gravure and flexography are the major printing processes for printing packing materials. These processes can be used for printing a large variety of substrates, such as paper, cardboard, or plastic substrates. The gravure and flexographic printing processes are well-known. Reference may be made, for example, to Leach/Pierce (Eds.), The printing ink manual, Blueprint, London, $5^{th}$ ed. 1993, p, 33-53. Also the characteristics of gravure and flexographic inks are known to the skilled man. Reference may be made, for example, to Leach/Pierce (Eds.), The printing ink manual, Blueprint, London, $5^{th}$ ed. 1993, p, 473-598. The respective content of those chapters is incorporated herein by reference.

According to a preferred embodiment of the present invention, on said transparent substrate there is provided a sequence of 2-5 of said ink layers, preferably a sequence of 3 of said ink layers. Said ink layers may be identical to each other but can also differ with respect to the amount and/or nature of the blend of pigment and filler. The layers are subsequently applied onto each other by the same method as described above, wherein the first ink layer is applied onto a surface of the transparent substrate, and any subsequent ink layer is applied onto a free surface of an already applied ink layer. Preferably, the layer surfaces are uniform and even, with no pinholes.

According to a particularly preferred embodiment of the present invention, at least one of said layers contains a silver pigment, and at least another one, preferably two, of said layers contains a white pigment. The layer containing the silver pigment provides for high light blocking effect at higher wavelengths in the UV/VIS range of the electromagnetic spectrum, and preferably is the outermost layer of said sequence of layers.

By providing the light-blocking layers as a sequence of different layers, the overall light-blocking effect can be enhanced, the deinking speed increased, and surprisingly the coating weight necessary for achieving these effects reduced. According to the present invention, a coating weight of 7-15 g/m$^2$, preferably 8-12 g/m$^2$, for the sum of all ink layers applied onto the transparent substrate is used.

Preferably, an overprint varnish is applied onto the (outermost) ink layer in order to protect and shield the ink layer from the environment. Any overprint varnish conventionally used in flexible packaging applications may be used. Such overprint varnishes are known and can be applied on the printing ink layer by any standard technique, preferably by flexographic or gravure printing.

According to a preferred embodiment of the present invention, said printed article as described exhibits a light-blocking performance in the range from 95-100%, preferably 99-99.9%, more preferably 99.4-99.8%, wherein light blocking is defined as reduction (in %) of a total transmittance of the printed article.

According to another preferred embodiment of the present invention, said printed article as described said printed article exhibits an L* value in the range from 85-95, preferably 89-92. L* defines the lightness of a color, and ranges from zero (black) to 100 (white). It can be measured with a standard spectrometer such as a Gretag SPM50 spectrophotometer.

Preferably, said printed article is a film, label or shrink sleeve to be applied onto a flexible packaging. The concept of the present invention is however not limited to flexible packagings, but can be used for deinking other substrates as well.

Many articles such as food articles are stored in flexible packagings, i.e. packagings which are made of a material which shows some flexibility and can thus undergo certain modifications of its shape.

Flexible packagings are widely used in areas like food packaging (e.g., retortable bags, frozen food packaging, refrigerated food packaging, shelf stable food packaging, dry goods packaging, liquid food packaging, fast food wrappers and bags), pharmaceutical packaging (e.g., primary packaging, secondary packaging, booklets and instructions), personal hygiene packaging (e.g. soap packaging, hair care packaging, baby care packaging, feminine care packaging, male care packaging), home care packaging (e.g. detergent packaging, cleaner packaging), agricultural packaging (e.g., herbicide packaging, pest control packaging, fertilizer bags), industrial packaging (e.g. shopping bags, construction wrappers and bags), and pet care packaging (e.g., pet food bags, pet medical packaging, pet hygiene packaging).

Labels and shrink sleeves are widely used in packaging, e.g. (plastic) bottles, containers and pouches.

The present invention is also related to a container for storing a light-sensitive product, preferably a food product, wherein said container comprises a transparent substrate containing on its outer surface a printed article according to the present invention as described above.

Preferably, said container is a flexible packaging.

More preferably, the substrate of said container is composed of polyethylene terephthalate. Especially preferably, as already described above the printed article has a transparent substrate composed of polyethylene terephthalate (PET) and is used in combination with a container that is also composed of polyethylene terephthalate (PET). In said case, the transparent substrate and the container can be readily recycled together, since they are made from the same material. The transparent substrate may be applied to the PET container by known methods, such as steam shrinking or shrinking with hot air.

The container may be a transparent PET bottle. The manufacture of PET bottles is well-known and need not be described here in detail (see e.g. Scheirs/long (eds.), Modern Polyesters, Wiley 2003).

Using the composition of the present invention, a substrate of a printed article and a container comprising said printed article on its outer surface can be quickly and efficiently deinked and thus recycled.

Thus, the present invention is also related to a method for recycling a container according to the present invention as described above, comprising the step of deinking the container in an alkaline aqueous medium, preferably containing 1 wt.-% NaOH based on the entire weight of the alkaline medium, at a temperature in the range from 50-90° C., preferably 60-85° C., for 1 to 15 min.

Optionally, the alkaline aqueous medium may contain a surfactant. According to the present invention, any conventionally available surfactant may be used. Preferably, said alkaline aqueous medium comprises 0.1 to 5 wt. %, preferably 0.1 to 1 wt.-%, based on the entire weight of the aqueous medium, of a surfactant.

The deinking step of the present invention can be carried out in any conventional device. Preferably, said device is equipped with a heating unit and a stirring unit.

During said method, not only the container but also the transparent substrate of the printed article becomes deinked and can be recycled together.

After deinking, the container and/or substrate of the printed article of the present invention is substantially devoid of printing ink, i.e. there should not be any observable remaining printing ink on the substrate. Accordingly, the container and/or substrate that has been deinked according to the present invention can be readily recycled by any conventional recycling method in the art, e.g. melt extrusion.

The present invention will now be described below in more detail by reference to non-limiting figures and examples.

Figure 1:
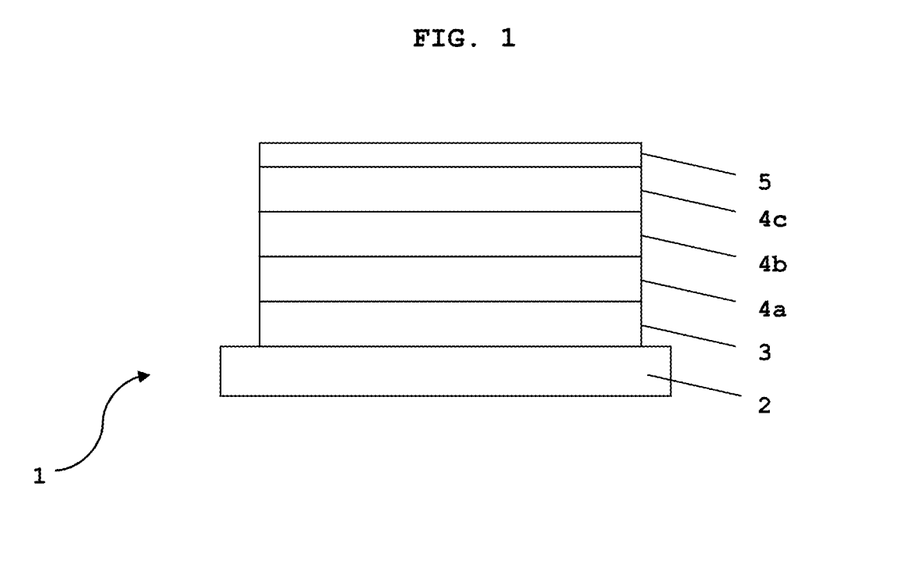
FIG. 1 shows an illustration of a container according to an embodiment of the present invention.

In FIG. 1 a container 1 according to an embodiment of the present invention is shown. The container 1 comprises a transparent substrate 2, e.g. a plastic substrate such as PET. On one surface of said substrate 2, there is applied a printed article according to the present invention. Said printed article comprises a transparent substrate 3, preferably from PET, and a sequence of ink layers 4a, 4b, 4c applied on one surface of the transparent substrate 3. An overprint varnish layer 5 is applied on top of said sequence of ink layers 4a, 4b, 4c.

In said preferred embodiment of the present invention, the ink layers 4a, 4b comprise a white pigment, such as $TiO_2$, whereas the ink layer 4c comprises a silver pigment.

Figure 2A:
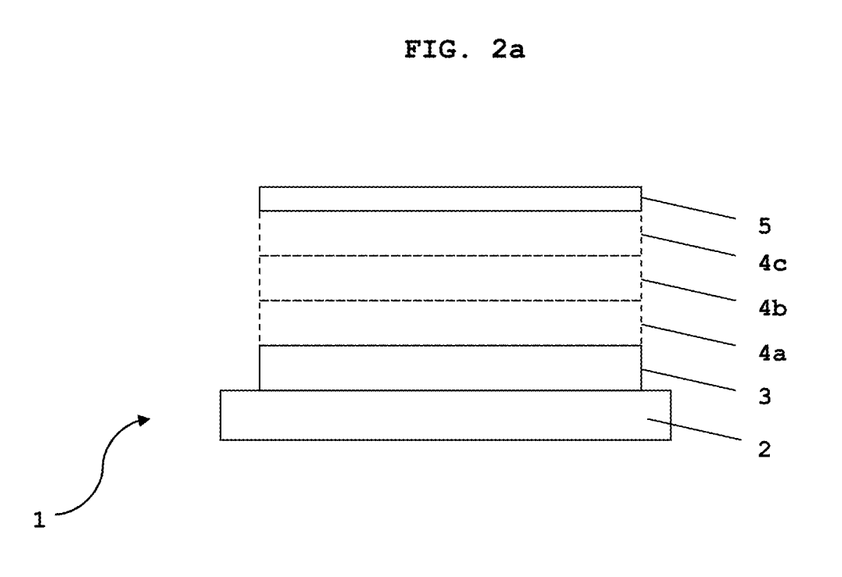
FIG. 2a shows a schematic illustration of the deinking process of the present invention.
Figure 2B:
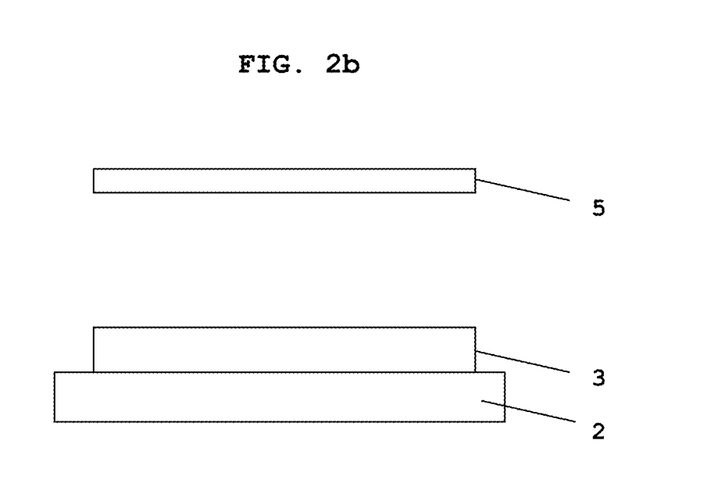
FIG. 2B shows another schematic illustration of the deinking process of the present invention.

In FIGS. 2a to 2b, the deinking process of the present invention is schematically illustrated.

In FIG. 2a, the container 1 during deinking is shown. It is shown that during the deinking step the ink layers 4a, 4b, 4c become dissolved (as illustrated by the broken boundaries).

In FIG. 2b, it is shown that after the deinking step the transparent substrate 1 and the transparent substrate 2 are separated and can be separately recycled.

In another preferred embodiment, also the overprint varnish layer 5 can be made such that it becomes dissolved during deinking, by making the overprint varnish layer 5 from a similar composition as the ink layers 4a, 4b, 4c (except for the pigment).

EXAMPLES 1 TO 9: PREPARATION OF AN INK COMPOSITION

The following components were added together under stirring, so as to result in a composition according to the present invention:

| Component | Ex. 1 (wt.-%) | Ex. 2 (wt.-%) | Ex. 3 (wt.-%) | Ex. 4 (wt.-%) | Ex. 5 (wt.-%) | Ex. 6 (wt.-%) |
|---|---|---|---|---|---|---|
| Nitrocellulose | 10 | 15 | 30 | 5 | 20 | 20 |
| Polyurethane resin | 5 | | 1.5 | | 2 | 7 |
| Maleic resin | 7 | | | | | 10 |
| Acrylic resin | | 20 | | 14 | | |
| PVA resin | | | 11 | | 19 | |
| Pigment/Filler | 42 | 12* | 10* | 35 | 30 | 23* |
| Silicone | 1 | 1 | 1 | | | |
| PE wax | 2.5 | 1 | | 2 | 3 | |
| Plasticizer | 1 | 1.5 | 0.5 | 1 | 1 | |
| Solvent | 31.5 | 49.5 | 45 | 43 | 25 | 40 |
| Total amount | 100 | 100 | 100 | 100 | 100 | 100 |

*silver pigment

The white pigment/filler component consisted of 80-99 wt.-% $TiO_2$ having a particle size (crystal size) in the range from 0.22 to 0.25 μm and 1-20 wt.-% filler (selected from the group consisting of $Al_2O_3$, $SIO_2$ and $ZrO_2$), based on the entire amount of the component.

In the same manner, the following UV-curable ink compositions were prepared.

| Component | Ex. 7 (wt.-%) | Ex. 8 (wt.-%) | Ex. 9 (wt.-%) |
|---|---|---|---|
| Acrylate Di-functional Monomer | 38% | 38% | 38% |
| Acrylate Monofunctional Monomer | 3% | 3% | 3% |
| Acrylate Di-functional Monomer | 21% | 25% | 25% |
| Aluminum Pigment | 13% | 13% | 13% |
| Polyester Acrylate | 19% | | |
| Epoxy Acrylate | | 15% | |
| Urethane Acrylate | | | 15% |
| Acrylate Stabilizer Blend | 3% | 3% | 3% |
| Photocatalyst | 8% | 8% | 8% |
| Total amount | 100 | 100 | 100 |

EXAMPLE 10: PREPARATION OF PRINTED ARTICLE

A printed article according to FIG. 1 was prepared by subsequently applying onto a biaxially oriented transparent PET substrate 3 ink layers 4a, 4b, 4c and an overprint varnish 5, by a flexographic printing process with a fineness of 150-200 lpi (lines per square inch) and a volume transfer of 5-10 bcm (billion cubic microns).

For the ink layers 4a, 4b, 4c, a composition according to example 1 was used, wherein the compositions for the ink layers 4a, 4b contained $TiO_2$ or a blend of $TiO_2$ and clay, and the composition for the ink layer 4c contained a silver pigment or a blend of a silver pigment and clay. The ink layers 4a, 4b, and 4c were applied in a coating weight of 8-12 g/m², for the sum of all ink layers applied onto the transparent substrate.

The thus obtained printed article was applied by standard methods onto a transparent PET substrate 1 serving as a flexible packaging, so as to obtain a container 1.

The container 1 was measured for its light blocking properties using a UV instrument (such as a spectrophotometer or similar optical instrument) coupled with integrating sphere. Samples that are hazy or turbid tend to scatter light away from the straight-line path from the sample to the detector. Such scattered light can be detected using a integrating sphere, which is a hollow ball of highly reflective material. With an integrating sphere, scattered light is collected by the sphere and led to one or more detectors positioned inside the sphere, yielding a measurement of the transmitted and forward scattered light (Taylor, Integrating sphere functionality: the scatter transmission measurement, Perkin Elmer 2013).

A light blocking performance of more than 95% was achieved.

The container 1 was measured for its color characteristics with a Gretag SPM50 spectrophotometer. An L value of 95 was obtained.

For comparison purposes, the above experiment was repeated with the exception that the composition for the ink layer 4c contained a white pigment instead of a silver pigment.

Figure 3:
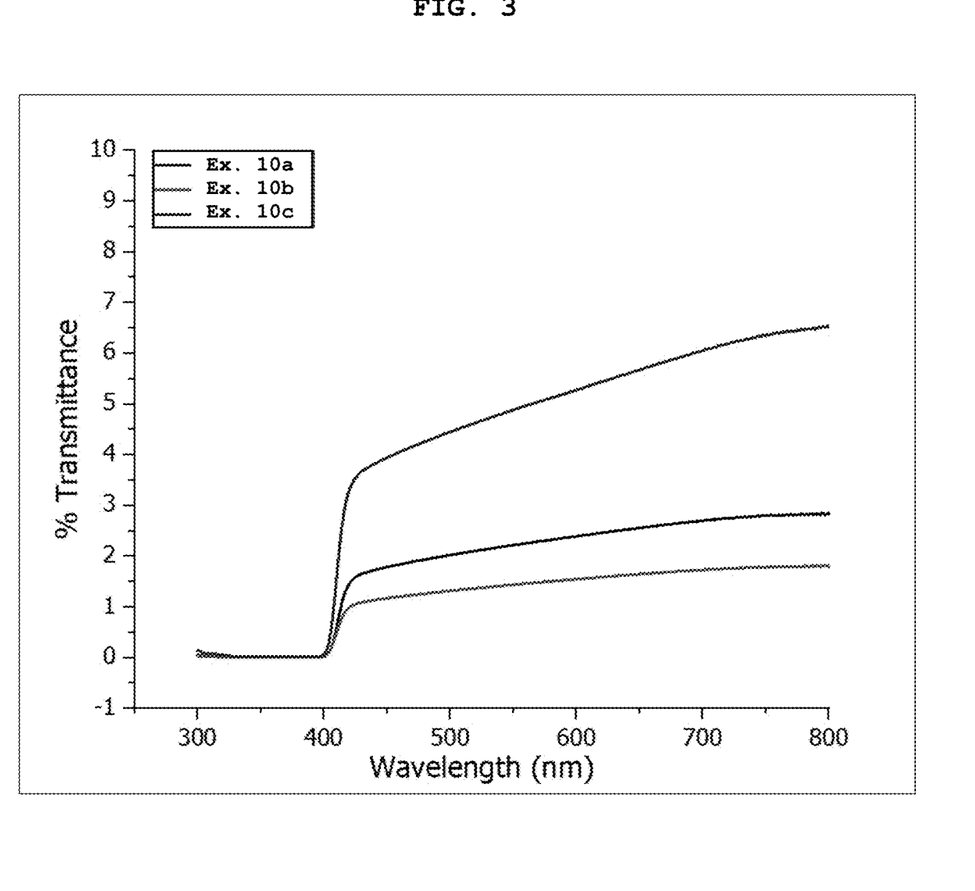
FIG. 3 shows a graphical illustration of the light blocking properties of different printed products with a different upper ink layer.

The results are shown in FIG. 3. In example 10a, the composition for the ink layer 4c contained a silver pigment. In example 10b, the composition for the ink layer 4c contained a blend of a silver pigment and clay. In example 10c, the composition for the ink layer 4c contained a white pigment. It can be seen that in the visual range of the electromagnetic spectrum (about 400 to 700 nm), example 10c with only white pigments and fillers in the product allowed more light transmittance (i.e. provided less light blocking) than the examples 10a and 10b containing a silver pigment in the upper layer 4c. A blend of silver pigment and filler in layer 4c showed less light transmittance than a silver pigment in layer 4c alone.

Figure 4:
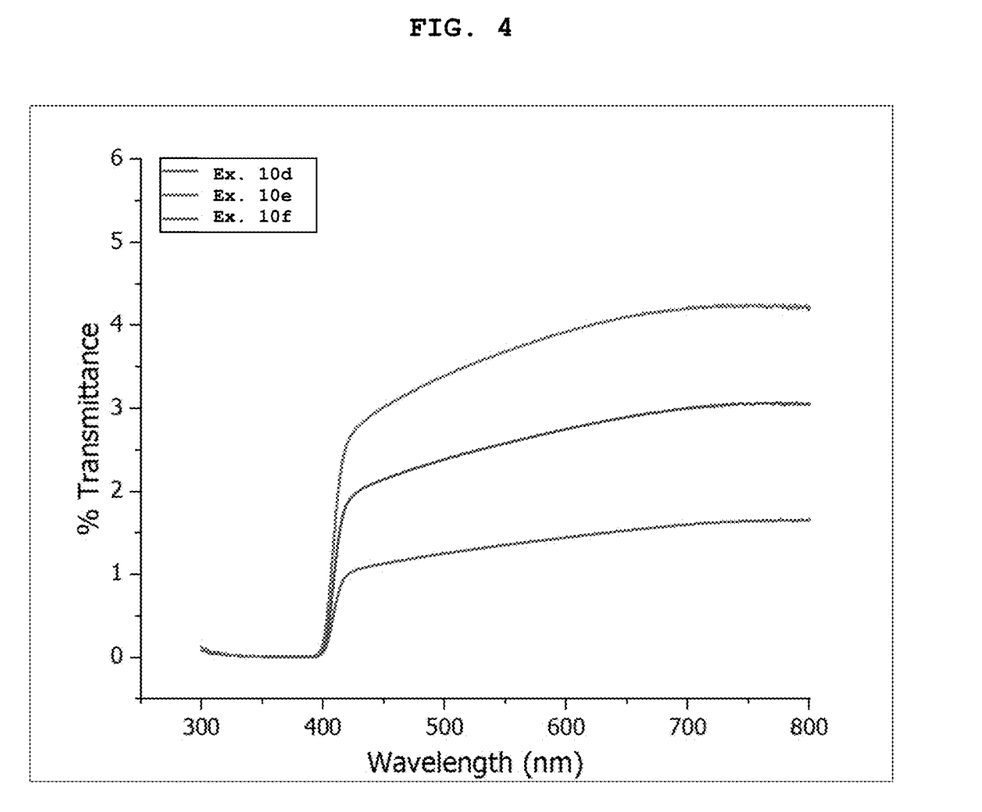
FIG. 4 shows a graphical illustration of the light blocking properties of different printed products with different white pigments.

In FIG. 4, comparative results are shown for experiments where in the layers 4a and 4b the following white pigments were used:

Example 10d: white pigment with a particle size (crystal size) of 0.22 μm and an oil absorption value of 19
Example 10e: white pigment with a particle size (crystal size) of 0.24 μm and an oil absorption value of 36
Example 10f: white pigment with a particle size (crystal size) of 0.23 μm and an oil absorption value of 17.

It can be seen from the results in FIG. 4 that optimum light blocking (least light transmittance was achieved with example 10 f. All examples achieved a light blocking of more than 95% in the visual range of the electromagnetic spectrum (about 400 to 700 nm).

Figure 5:
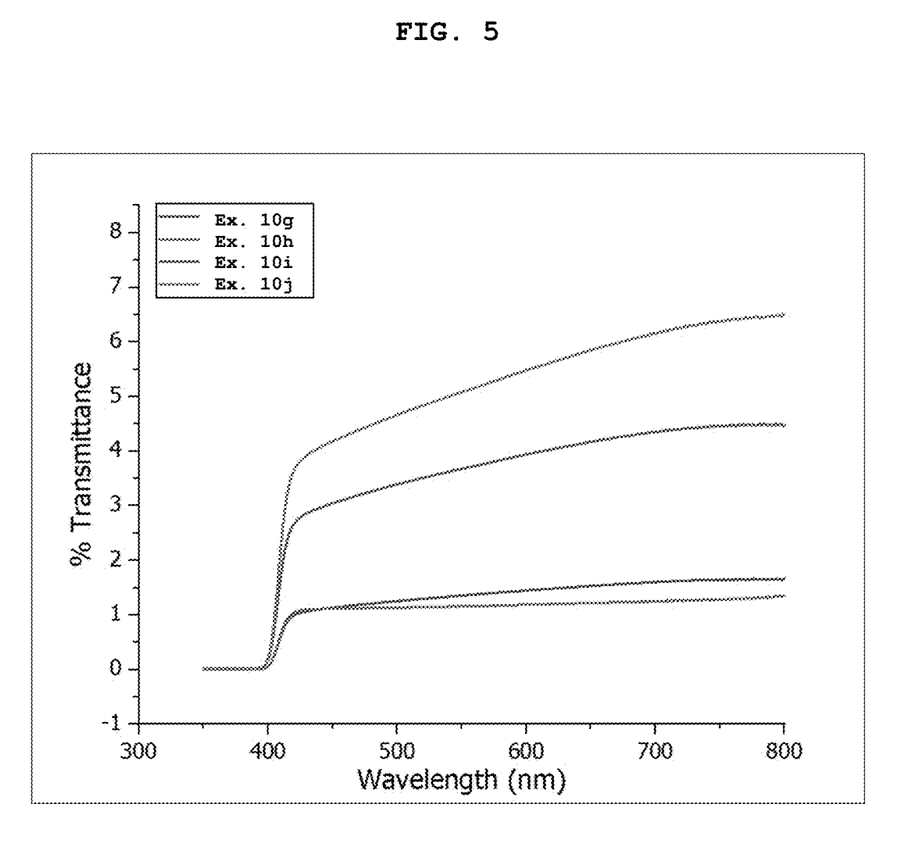
FIG. 5 shows a graphical illustration of the light blocking properties of different silver products.
Figure 6A:
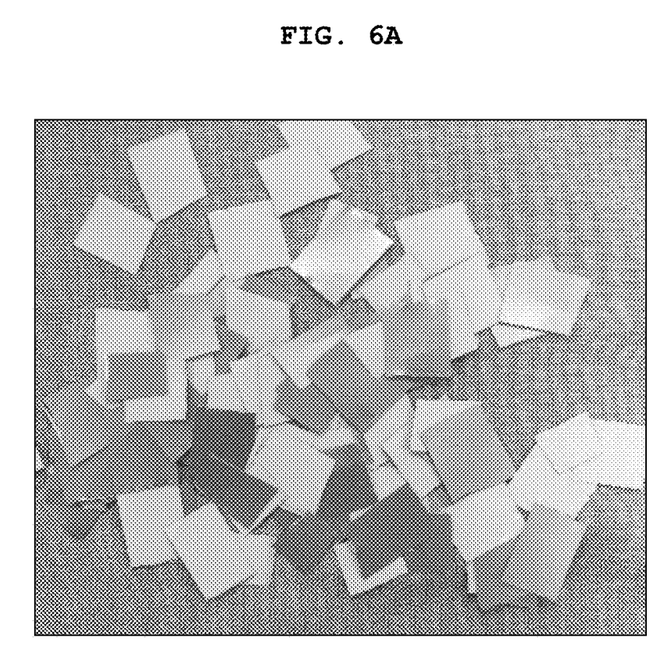
FIG. 6A shows a photograph of printed samples of the present invention before the deinking process.
Figure 6B:
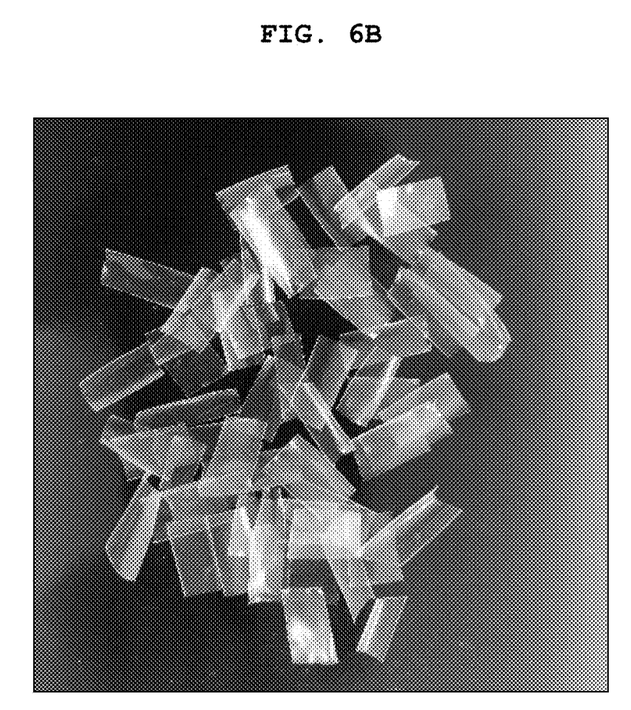
FIG. 6B shows a photograph of printed samples of the present invention after the deinking process.

In FIG. 5, comparative results are shown for experiments where in addition to using the same white pigment in the layers 4a and 4b, in layer 4c the following silver pigments were used:

Example 10g: silver (aluminium) leafing cornflake pigment with a $D_{50}$ particle size of 11 μm (65 wt.-%:35 wt.-% blend with clay filler)
Example 10h: silver (aluminium) VMP non-leafing pigment with a $D_{50}$ particle size of 10 μm (8 wt.-%:92 wt.-% blend with clay filler)
Example 10i: silver (aluminium) non-leafing cornflake pigment with a $D_{50}$ particle size of 11 μm (80 wt.-%:20 wt.-% blend with clay filler)
Example 10i: silver (aluminium) non-leafing cornflake pigment with a $D_{50}$ particle size of 13 μm (65 wt.-%:35 wt.-% blend with clay filler).

It can be seen from the results in FIG. 5 that optimum light blocking (least light transmittance was achieved with example 10 h, i.e. a vacuum metalized pigment (VMP) in a non-leafing grade. All examples achieved a light blocking of more than 94% in the visual range of the electromagnetic spectrum (about 400 to 700 nm).

EXAMPLE 11: DEINKING PROCESS

The printed article according to example 4 was cut into pieces of approximately a size of 0.25 to 0.5 inches (0.63 to 1.27 cm).

Into a stainless steel vessel, tap water was added in such an amount that it corresponded to four times the amount of PET to be deinked. The water was heated, and NAOH granules were added in such an amount that an alkaline aqueous medium was prepared that contained 1 wt.-% NaOH. 0.3 wt.-% of a surfactant (for example Triton X-100) was added.

When the temperature of the deinking solution reached 85° C., the calculated amount of flakes of the container 1 were added, and the alkaline solution was stirred (impeller, speed of 240 m/min). After 15 minutes, the solution was allowed to cool and filtered, and the treated cut pieces were washed with water.

In addition, it was found that complete deinking was achieved at 85° C. in 15 min.

The result of this deinking process is shown in FIGS. 3A and 3B. As shown in FIG. 3A, the printed samples before deinking were highly opaque, whereas as shown in FIG. 3B the samples after deinking were transparent, due to removal of the ink layer.

In the table below, values for a pure PET sample (uncoated PET) as compared to a PET sample obtained by the above deinking process are provided.

| Pure PET | | | Deinked PET | | |
|---|---|---|---|---|---|
| L* | a* | b* | L* | a* | b* |
| 89.31 | 0.02 | 2.32 | 88.98 | −0.18 | 2.44 |

The invention claimed is:

1. A composition for manufacturing a layer that is capable of at least partially blocking light in the UV/VIS region and is deinkable, said composition comprising:
   10-50 wt.-% of a blend of a pigment and a filler;
   10-40 wt.-% of a first binder component, selected from the group consisting of nitrocellulose, polyurethane, and combinations thereof
   5-30 wt.-% of a second binder component selected from the group consisting of maleic resin, a polyvinyl ester, and combinations thereof
   wherein all wt.-% are based on the entire weight of the composition.

2. The composition according to claim 1, wherein said pigment is selected from the group consisting of a white pigment, preferably TiO2, and a silver pigment.

3. The composition according to claim 1, wherein said filler is selected from the group consisting of clay, barium sulfate, mica and calcium carbonate.

4. The composition according to claim 1, wherein the blend contains said at least one white pigment and said filler in a range from 99:1 to 80:20, or said at least one silver pigment and said filler in a range from 5:95 to 90:10.

5. The composition according to claim 1, wherein said white pigment has an average particle size (crystal size) in the range from 0.12 to 0.3 µm.

6. A printed article, comprising a transparent substrate and on said transparent substrate at least one ink layer that is capable of at least partially blocking light in the UV/VIS region and is deinkable, said layer being made from a composition according to claim 1.

7. The printed article according to claim 6, wherein the transparent substrate is composed of polyethylene terephthalate.

8. The printed article according to claim 6, wherein on said transparent substrate there is provided a sequence of 2-5 of said ink layers.

9. The printed article according to claim 8, wherein at least one of said layers contains a silver pigment, and at least another one of said layers contains a white pigment.

10. The printed article according to claim 6, further comprising an overprint varnish applied on said sequence of ink layers.

11. The printed article according to claim 6, wherein said printed article exhibits a light-blocking performance in the range from 95-100%.

12. The printed article according to claim 6, wherein said printed article exhibits an L* value in the range from 85-95.

13. A container for storing a light-sensitive product, preferably a food product, wherein said container comprises a transparent substrate containing on its outer surface a printed article according to claim 6.

14. The container according to claim 13, wherein the substrate of said container is composed of polyethylene terephthalate.

15. A method for recycling the container according to claim 13, comprising a step of deinking the container in an alkaline aqueous medium at a temperature in the range from 50-90° C. for 1 to 15 min.

16. The composition of claim 1 comprising an organic solvent and additives.

17. The composition of claim 5 wherein the average particle size is from 0.22 to 0.25 µm.

18. The printed article according to claim 8 wherein on said transparent substrate there is provided a sequence of 3 of said ink layers.

19. The method of claim 15 wherein the alkaline aqueous medium contains 1 wt % NaOH based on the entire weight of the alkaline medium.

20. The method of claim 15 wherein the step of deinking the container is at a temperature in the range of from 60 to 85° C.

* * * * *